United States Patent Office 3,527,725
Patented Sept. 8, 1970

3,527,725
PHOSPHORUS-CONTAINING POLYMERS
Richard Strauss, Lexington, and James Bottomley, Tewksbury, Mass., assignors to National Polychemicals, Inc., Wilmington, Mass., a corporation of Massachusetts
No Drawing. Continuation-in-part of application Ser. No. 675,299, Oct. 16, 1967. This application June 9, 1969, Ser. No. 831,744
Int. Cl. C08g 5/18, 37/18
U.S. Cl. 260—29.3
20 Claims

ABSTRACT OF THE DISCLOSURE

Phosphorus-containing polymers useful as stabilizers in a variety of polymeric compositions, particularly elastomeric compositions such as styrene/butadiene rubber, are prepared by reacting trivalent phosphorus compound with a thermoplastic resinous novolak, such as for example, the reaction of phosphorus trichloride or organic phosphite with a phenol formaldehyde novolak resin.

---

This application is a continuation-in-part of application Ser. No. 675,299, filed Oct. 16, 1967, which is a division of application Ser. No. 462,385, filed June 8, 1965, which is a continuation-in-part of applications Ser. Nos. 377,110 filed June 22, 1964 and 441,369 filed Mar. 19, 1965.

BACKGROUND OF THE INVENTION

The stabilization of polymeric materials is of significant commercial and economic concern because of the fact that polymers generally suffer from susceptibility to degradation from heat and light; and thus are subject to a diminishing of properties on processing and/or storage.

Phosphorus-containing compounds, particularly phosphites of organic compounds have been found to be particularly suitable for use in the stabilization of polymeric compositions. Trisnonyl phenyl phosphite is one of the most widely used phosphite stabilizers.

Such phosphite stabilizers, including the widely used trisnonyl phenyl phosphite, have not been entirely satisfactory, however, for a variety of reasons, such as incompatibility with the particular polymers, susceptibility to hydrolysis, which renders such materials ineffective in latex compositions, lack of high temperature stability and the inability to function as stabilizers over relatively extended periods of time.

A composition has now been found which is not susceptible to the deficiencies of the prior art.

SUMMARY OF THE INVENTION

The present invention is concerned with phosphorus-containing polymers, their preparation and their use as stabilizers.

It has been found that the phosphorus-containing polymers as hereinafter described are of considerable utility inter alia as stabilizers for plastics.

Accordingly, the present invention is directed to phosphorus-containing polymers prepared by the reaction of a phenol, an aldehyde and a trivalent phosphorus compound.

In one embodiment of the invention, the phosphorus-containing polymers prepared by the reaction of a phenol and an aldehyde to form a thermoplastic polymer which is then reacted with a trivalent phosphorus compound; these polymers are hereinafter referred to as ester polymers.

DETAILED DESCRIPTION OF THE INVENTION

The phosphorus-containing polymers may be characterized by a conventional resinous condensation formula when one or more of the hydrogens of the hydroxyl radical of the phenolic groups are replaced by a bond to the phosphorus atom. Where stoichiometric quantities of a trivalent phosphorus compound are used all or substantially all of the hydroxyl radicals will be reacted.

A typical phosphorus-containing polymer made under acidic conditions, will have ortho rather than para condensation. The phenolic groups of the resin may be unsubstituted or substituted with hydrocarbon radicals such as an aliphatic, alicyclic, alkyl, alkylene, aryl, or mixed alkylaryl or other organic radicals, with $C_4$–$C_{12}$ alkyl radicals preferred. The amount of phosphorus may vary with a stoichiometric amount of phosphorus being one atom for each three phenolic radicals. Where less phosphorus is employed, the condensation product may have free hydroxyl groups.

Where substantially stoichiometric quantities are reacted the phosphorus-containing polymers of the present invention are composed of recurring units represented by the formula:

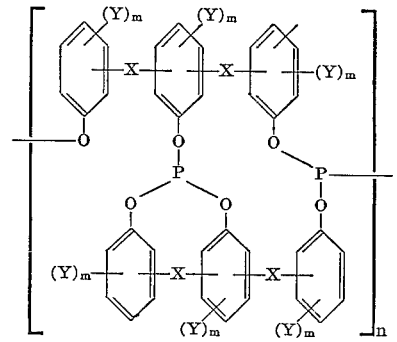

wherein X is an alkylidene radical, e.g., a lower alkylidene radical; preferably a 1–4 carbon alkylidene radical like methylene; Y is an alkyl, aryl, alkylaryl or halogen; preferably a $C_4$ to $C_{12}$ alkyl radical, more preferably a $C_9$ alkyl radical; $m$ is an integer from 0 to 3; and $n$ is at least 3. Each X and Y may be the same or different.

The molecular weight of the polymers of the present invention is preferably at least 4500.

The phosphorus-containing polymers may range from viscous liquid to solids, depending upon the nature of the reactants and the conditions of the reaction. The phosphorus-containing polymers have utility as stabilizers and as components in stabilizer and antioxidant systems in plastics, resins, and elastomers. The phosphorus-containing polymers are particularly useful as heat and processing stabilizers in hydrocarbon resins and conjugate diene elastomers subject to color and thermal degradation such as polyolefins, like polypropylene resins and styrene-butadiene rubber (hereinafter referred to as SBR).

In the preparation of the ester polymers, the phenol may be phenol, an alkyl substituted phenol or an alkylene bisalkyl phenol; the aldehyde is suitably formaldehyde. The common preparation of a phenol-formaldehyde thermoplastic resin or novolak comprises the reaction of a phenol or an alkylated phenol such as a para alkylated phenol with formaldehyde in the presence of an acid or basic catalyst. The formaldehyde is employed in a mol ratio of less than 1 mol of formaldehyde per mol of phenol; e.g., from about 0.10 to 0.95 mol of formaldehyde or less than a stoichiometric amount. The acid catalyzed reaction is usually carried out in a one-step reaction at a pH of less than about 1.5 and results in a thermoplastic resinous condensation product which is characterized by being soluble in certain organic solvents, such as alcohol, but not significantly soluble in water or hydrocarbons. These acid catalyzed fusible thermoplastic resins are commonly referred to as novolaks. Thermoplastic novolaks may also be prepared by reacting in two separate stages at higher acid pH values to produce a novolak which is mainly linked through the ortho rather than the para positions of the phenol rings. Alkylated $C_4$–$C_{18}$ phenols, e.g., $C_4$–$C_9$ having para alkyl groups have been particularly useful in preparing ester polymers useful as stabilizers. After the preparation of the thermoplastic phenolic resin the acid catalyzed product is usually distilled to remove water and low molecular weight products, and may then be neutralized by the addition of an alkaline salt such as sodium carbonate.

The condensation reaction product of the phenolic resinous novolak is then reacted with the trivalent phosphorus compound which is suitably phosphorus trichloride, in bulk or in an organic solvent such as $C_1$ to $C_6$ alcohol or a hydrocarbon such as an aromatic hydrocarbon like benzene, toluene, and xylene or mixtures thereof usually at a temperature of between 40° to 85° C. A stoichiometric amount of phosphorus trichloride (i.e. 1 mol of $PCl_3$ to 3 mols of phenol) may be used to react with the free hydroxy groups of the phenol ring, where a product approaching maximum phosphorus theoretical content is desired, e.g., about 3 to 8 weight percent. Typical ester polymers may be prepared by reacting one mol of phenol or alkylated phenol (i.e., the phenol content of the novolak resin) with about 0.05 to 0.33 mol of phosphorus trichloride. Where less than a stoichiometric amount of $PCl_3$ is used, the resulting product will be a partial ester polymer having free hydroxy groups. The free hydroxy groups may be located on the terminal portions of the polymer chain or distributed throughout the polymer. The ester polymers with free hydroxyl groups are useful where this is to be an intermediate product or when a stabilizer with antioxidant properties is desired. Phenolic components such as alkylated phenols like alkylene bisalkylated phenol such as methylene bisbutylated cresol provide ester polymers with stabilizer and antioxidant properties. The ester polymers have the hydrogen of the hydroxyl groups replaced with a direct bond from the oxygen of the phosphorus atom.

Typical aldehydes suitable for use in the present invention include: formaldehyde, both in aqueous and anhydrous solvent solution, paraformaldehyde, acetaldehyde, glyoxal, furfural and the like as well as materials which under the reaction conditions employed release a suitable aldehyde. Hexamethylenetetramine or metal formates like calcium formate which on heating generate reactive methylene radicals may also be employed. Formaldehyde and hexamethylenetetramine have been found to be particularly effective aldehydes.

Although phosphorus halides like the trichloride may be employed as the trivalent phosphorus compound, the phosphorus containing polymers may also be prepared by transesterification reaction with organic phosphites such as with phenyl phosphites like triphenyl phosphite, tri-p-t-butyl phenyl phosphite; alkyl phosphites like triethyl phosphite, trimethyl phosphite as well as dimethyl phosphonium chloride and other phosphite compounds.

The phosphorus-containing polymers according to the present invention are preferably reacted in bulk or in an organic or nonaqueous solvent such as an alcohol, ester, ketone, hydrocarbons and the like to reduce hydrolysis during the reaction.

The phosphorus containing polymers according to the present invention aid in preventing a change in color or mechanical strength properties during processing or storage of the polymer, plastic, elastomer, or resin into which they are incorporated. The phosphorus containing polymers may be used alone, or in combination with and as a component of other and conventional stabilizer systems, and may be used in a wide variety of plastics requiring stabilizers such as vinyl resins like polyvinyl-chloride and vinylchloride-vinyl acetate copolymers, polyesters, urethanes, acrylic resins, styrene resins like polystyrene, and rubber modified polystyrene, and in other polymers, particularly those thermoplastic hydrocarbon resins and polymers which normally develop color on storage or during processing at elevated temperatures. The solid phosphorus-containing polymers may be employed as the phosphite chelator with barium-cadmium, barium-zinc, barium-cadmium-zinc, and cadium-zinc stabilizing systems in vinyl resins.

The phosphorus-containing polymers according to the present invention may also be employed with natural and synthetic elastomers such as those homo and copolymer diene conjugate elastomers requiring a stabilizer additive. Such elastomers would include, but not be limited to; rubbery styrene-butadiene copolymers (SBR), as well as polymers of butadiene and acrylonitrile such as acrylonitrile - butadiene copolymers, acrylonitrile - butadiene-styrene copolymers, (ABS), polybutadiene, butyl rubber, and acrylonitrile-styrene copolymers. Other elastomers include natural rubber, carboxylated elastomers ethylene-propylene rubbery copolymers and terpolymers such as with dienes like cyclopentadiene.

The phosphorus-containing polymers according to the present invention find significant utility as stabilizer additives in natural and synthetic hydrocarbon resins such as $C_2$–$C_4$ polyolefin resins like polypropylene, polyethylene, ethylene-propylene copolymers, polybutene, etc.

Polypropylene resins and propylene copolymers are inherently more prone to oxidation than polyethylene resins, and usually require a higher processing temperature than polyethylene resins. Organic phosphites such as triphenyl phenyl phosphites are conventionally employed in polypropylene, however, previous organic phosphites have not proved wholly satisfactory in preventing colour development during processing or in storage. The phosphorus-containing polymers according to the present invention aid in protecting the colour and the physical properties significantly better than trisnonyl phenyl phosphite the conventional organic phosphite now used in polyethylene and polypropylene.

The phosphorus-containing polymers according to the present invention may be used alone or in combination with other additives such as stabilizers and anti-oxidants such as organic phosphites like trisnonyl phenyl phosphite, alkylated phenols like butylated hydroxy cresol and toluene, aromatic amines, borates, alkylene bisalkylated phenols like methylene bis 2.6 para tertiary butyl cresol, thio bisalkylated phenols, and BB' thio propionic acid esters like dilauryl and distearyl thio dipropionate and the like. The phosphorus-containing polymers according to the present invention may be added, milled into, or dispersed directly in bulk into the material to be stabilized or added to solutions or emulsions of the material. Typically the phosphorus-containing polymers according to the present invention are added as stabilizers in amounts of from about 0.1 to 5 percent by weight, e.g. 0.5 to 2.0 weight percent to the material to be protected.

The following non-limiting examples illustrate the preparation of the compounds of the present invention.

Example 1

A one (1) liter flask equipped with stirrer, thermometer, water-jacketed condenser and a nitrogen sparge line was charged with 220 grams (1 mol) of nonyl phenol. The nitrogen sparge was turned on, and two grams of an oxalic acid catalyst and 11 grams of paraformaldehyde (91 percent formaldehyde, 0.33 mol) added to the nonyl phenol. The temperature of the reaction mixture was then raised from room temperature to 90–100° C. for about 2 hours and the temperature was then raised to 120° C. for two hours to complete the reaction of a thermoplastic novolak resin and to remove the water formed in the reaction. Forty-six grams (0.33 mol) of phosphorus trichloride was then added dropwise to the novolak, while the temperature was maintained at approximately 60° C. The temperature of the reaction mixture was raised to about 90° C. for one hour and then raised to 120° C. for two hours to drive off hydrogen chloride. An alkaline neutralizer comprising three grams of sodium carbonate was added to the reaction mixture, and the reaction mixture stirred for one hour. The reaction product was recovered by filtering at about 100° C. and was a pale yellow viscous liquid phosphite ester characterized by a refractive index of 1.5326, a specific gravity of 1.01–1.02 at 25° C., a viscosity of about 1,000,000 cps. and a weight percent of phosphorus of 4.08 percent (theoretical 4.47 percent). This ester polymer was soluble in benzene, hexane, acetone and mineral oil. The molecular weight of the polymer was determined by dissolving the polymer in toluene and measuring the osmotic pressure with a 600 Stabel gel cellophane membrane. The average molecular weight was found to be about 4500.

Example 2

Example 1 was repeated employing a phenol-formaldehyde resin novolak to obtain an opaque white solid ester polymer having a melting point of about 80 to 90° C.

Example 3

The stabilizing effect of the phosphorus-containing polymers according to the present invention in representative polypropylene resins during processing was determined by mixing polypropylene resin samples with and without stabilizing additives in a Brabender Plastigraph at 200° C. for 30 minutes and then pressing the samples into squares 2″ x 2″ x 1/16″. The samples were then compared for color development and strength. Typical results are shown in Table 1, employing a polypropylene resin Profax 6513 (a product of the Hercules Powder Co.) having a melt index of about 2.8. This resin has an original translucent white colour. Profax 6513 contains an antioxidant stabilizing system which included about 0.25 weight percent butylated hydroxy toluene, (2,6-ditertiary butyl cresol) (BHT) and 0.25 weight percent of dilaurylthio-di propionate (DLTP). The hindered phenol and dipropionate are added to the resin during polymerization which produces a more stabilized product.

TABLE 1.—EFFECT OF PHOSPHITE POLYMERS AS STABILIZERS IN POLYPROPYLENE DURING PROCESSING

| Polypropylene sample 6513 with— | Colour after processing |
|---|---|
| (1) No additive | Tan colour. |
| (2) 0.5 weight percent trisnonylphenyl phosphite | Pale tan. |
| (3) 0.5 weight percent ester polymer according to Example 1 | Light tan. |

This data illustrates that the phosphorus-containing polymers according to the present invention are more effective than trisnonylphenyl phosphite in inhibiting colour development of stabilized polypropylene resin during processing.

Example 4

A really effective stabilizer will not only inhibit a degradation of the polypropylene during processing, but will also reduce colour development and strength diminution during storage or heat ageing.

Stabilized Profax 6513 after processing at 200° C. for 15 minutes gradually develops a yellow colour on storage. Trisnonylphenyl phosphite is ineffective in preventing this colour development, while the phosphorus-containing polymers according to the present invention are remarkably more effective. Heat ageing tests were conducted by preparing samples on the Brabender at 200° C. for 15 minutes and then pressing the samples into squares 2″ x 2″ x 1/16″. These squares are then heat aged in an oven at 150° C. for seven days (168 hours) and then observed for colour development and strength. Table II illustrates the results of typical tests of heat ageing on both Profax 6513 and Profax 6501, an essentially unstabilized white propylene resin.

TABLE 2.—EFFECT OF PHOSPHORUS-CONTAINING POLYMER AS STABILIZER IN POLYPROPYLENE ON STORAGE

| Sample | Colour | Strength |
|---|---|---|
| 1. 6513 no additive | Dark brown (after 96 hours) | Crumbles when picked up. |
| 2. 6513, 0.5 wt. percent of trisnonylphenylphosphite | Dark yellow to brown (after 96 hours) | Crumbles along the edges when picked up. |
| 3. 6513, 0.5 wt. percent of ester polymer according to Example 1. | Pale yellow (after 168 hours) | Appears to have original strength. |
| 4. 6501 no additive | Dark brown (after 48 hours) | Crumbles when picked up. |
| 5. 6501, 0.5 wt. percent trisnonylphenylphosphite; 0.25 wt. percent DLTP; 0.25 wt. percent BHT. | Dark brown (after 72–96 hours) | Do. |
| 6. 6501, 0.5 wt. percent ester polymer according to Example 4; 9.25 wt. percent DLTP; 0.25 wt. percent BHT. | Light brown (after 168 hours) | Appears to have original strength. |

As shown above, the phosphorus-containing polymers according to the present invention protect the colour and strength properties of stabilized and unstabilized polypropylene resins to a far greater degree than the conventional organic phosphite trisnonylphenyl phosphite. As shown by the data, the phosphorus-containing polymers are particularly useful in combination with antioxidant additives.

Example 5

In order to determine the effectiveness of the polymers of the present invention as stabilizers, an unstabilized styrenebutadiene latex (American Synthetic Rubber 1502 latex) was employed as the test medium. For comparative purposes the following compounds were prepared according to the procedure set forth in U.S. Pat. No. 3,297,631 (column 12, lines 46–57).

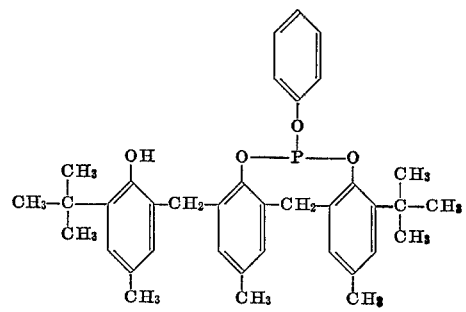

M.P. 141–145° C.

COMPOUND A (Patent compound IV, column 3, lines 38–50)

Compound A, however, was not emulsifiable by conventional methods employed in the industry or by any other technique employed and consequently could not be tested for stabilizing properties in SBR latex.

In order to prepare a prior art compound of the type of compound A, compound B was prepared substituting nonyl phenol for the hindered phenol used in compound A.

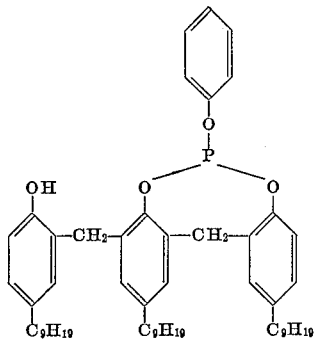

COMPOUND B

Mono phenyl phosphite of 2,2'-bis(5-nonyl-2-hydroxy phenyl) mesitol

Compound B was found to be emulsifiable with potassium oleate and was incorporated in SBR latex (ASR #1502). Similarly the compound of Example 1 was emulsified with potassium oleate and incorporated into the latex. Both materials were employed at a level of 1 part by weight per hundred parts of latex. Strips of filter paper were dipped in the latices, dried and then exposed to elevated temperatures. The darkening of the filter paper was taken as a measure of the stabilizing properties of the materials. Numerical values were assigned to the test results with 10, the highest number, assigned to the Control, or unstabilized latex in each case, and 1 assigned to the test strips before exposure to the elevated temperatures.

TABLE 3

|  | 2 hrs. at 155° C. | 16 hrs. at 150° C. |
| --- | --- | --- |
| Unstabilized latex | 10 | 10 |
| Latex with Compound B | 7 | 10 |
| Latex with polymer of Ex. 1 | 3 | 4 |

From the foregoing table it will be seen that the stabilizing properties of the present invention are at least twice as great as those of compound B. In fact, the data of column 2 shows compound B to be no better than the unstabilized latex sample, indicating that the antioxidant has failed. This is particularly unexpected since the polymer of Example 1 contains only about 8.2% free hydroxyls, whereas in compound B one-third of the hydroxyls are free. According to currently held theories of the mechanisms of antioxidants the compound having the greater number of hydroxyls should be more effective.

Example 6

The resistance to hydrolysis of the polymers of the present invention was determined by preparing a 20% emulsion of the material with sodium oleate, adjusting the pH to 11.5 and placing it in the oven at 78° C. Samples were taken periodically and titrated back to 11.5 with sodium hydroxide. The degree of hydrolysis was determined from the amount of titrant required.

TABLE 4

|  | Percent hydrolyzed | |
| --- | --- | --- |
|  | Polymer of Example 1 | Compound B |
| Time, hours: | | |
| 20 | 0.44 | 11.5 |
| 27 | 2.46 | 17.1 |
| 75 | 2.63 | 38.4 |
| 160 | 30.60 | 75.5 |

The pH of compound B changed from an initial pH of 11.5 to 5.0 after 68 hours while the pH of the product of Example 1 went from 11.5 to 10.8.

Example 7

The novel polymers of the present invention when used in latex compositions minimize the gel formation.

PROCEDURE FOR DETERMINING GEL FORMATION 2.34 parts of oleic acid and 0.62 parts of sodium hydroxide was dissolved in 192.5 parts of distilled water. To this solution was added with vigorous stirring 50 grams of the stabilizer to be tested. 17.9 grams of the resulting emulsion which contains 3.65 grams of the stabilizer is added to 1,460 grams of SBR latex (20% solids). The latex employed was type 1502 (American Synthetic Rubber Co.). The latex was coagulated by addition to an acid-brine solution. The resulting crumb was separated, filtered, and dried at a low temperature. The crumb was then placed in an oven at 100° C. with samples removed at 0, 24, and 48 hour periods. The thus-removed samples were soaked in benzene for 12 hours. The solution was shaken and then allowed to settle. A 100 cc. aliquot of the solution was removed through a fine screen and evaporated to dryness. The percent gel present is determined by difference with the amount of rubber recovered in the dried sample, according to the following formula:

$$\frac{\text{Weight of original sample-weight of rubber in benzene (adjusted for sample size)}}{\text{Weight of original sample}} \times 100 = \text{percent gel}$$

The aforementioned gel determination test was carried out on the product of Example 1 and compared with a conventional stabilizer and unstabilized latex and the results of the test illustrated in the table below:

TABLE 5

|  | Unstabilized latex | Latex stabilized with product of Ex. 1 | Trisnonyl phenyl phosphite |
| --- | --- | --- | --- |
| 0 hours | 5.8 | 0 | 1.3 |
| 24 hours | 81.1 | 1.1 | 7.2 |
| 48 hours | 81.8 | 13.5 | 29.4 |

From the foregoing, it can be seen that less gel is produced from a latex stabilized with the polymer of the present invention than with a widely-used conventional phosphite stabilizer on a comparative basis.

Example 8

In still other tests, the antioxidant properties were determined by measuring the color change of a piece of filter paper which had been dipped into latex, air dried and placed in an oven. The color change was determined by reflectance which was measured by a Photovolt proto-electric reflectance meter, Model 610, using a green filter. The instrument was calibrated using the base filter paper as 100. The additives were used at the levels indicated.

TABLE 6.—SBR LATEX (ASR 1502) 10 DAYS AT 100° C.

|  | Reflectance | |
| --- | --- | --- |
|  | 2 p.p.m. | 4 p.p.m. |
| Unstabilized latex | 73 | 73 |
| Trisnonyl phenyl phosphite | 74.5 | 71 |
| Commercial hindered bisphenol | 76.5 | 65 |
| Commercial alkylated hindered phenol | 72 | 70 |
| Stabilizer of Example 1 | 77.5 | 81.5 |

TABLE 7.—SBR CARBOXYLATED LATEX
(DAREX 32758M)

[Additives used at 2% by weight of latex. Oven exposure times are cumulative]

| | Reflectance | | |
|---|---|---|---|
| | 10 days at 100° C. | 3 days at 120° C. | 1 day at 135° C. |
| Unstabilized latex | 58 | 27 | 10 |
| Commencial hindered bisphenol | 78 | 58 | 38 |
| Trisnonyl phenyl phosphite | 84 | 29 | 12 |
| Commercial alkylated hindered bisphenol | 76 | 61 | 35 |
| Commercial alkylated hindered phenol | 66 | 35 | 15 |
| Stabilizer of Example 1 | 84 | 68 | 47 |

TABLE 8.—SBR CARBOXYLATED LATEX
(TYLAC 8140)

[Additives used at 2% by weight of latex. Oven exposure times are cumulative]

| | 10 days at 100° C. | 3 days at 120° C. | 1 day at 135° C. | 6 hrs. at 150° C. |
|---|---|---|---|---|
| Unstabilized latex | 41 | 14 | 5 | 3 |
| Commercial hindered bisphenol | 75 | 56 | 42 | 34 |
| Trisnonyl phenyl phosphite | 62 | 20 | 9 | 5 |
| Commercial alkylated hindered bisphenol | 69 | 51 | 44 | 32 |
| Commercial alkylated hindered phenol | 66 | 22 | 10 | 5 |
| Stabilizer of Example 1 | 70 | 52 | 41 | 24 |

Tables 6, 7, and 8 show a comparison of the product of the present invention with a widely used commercial stabilizer and with widely used and accepted commercial antioxidants, i.e., the hindered phenols and bisphenols. The data shows that the product of the present invention is not only superior to the commercial stabilizer, but also is in most cases as good as, or better than, commercial antioxidants and does not even possess the hindered phenol structure usually associated with antioxidants.

The phosphorus-containing polymers according to the present invention are normally employed as soluble fusible polymers due to the ease of incorporation into a resin, plastic or elastomer; however, if desired, the phosphorus-containing polymer may be cured wholly or partially to an infusible insoluble product. The infusible phosphorus-containing polymers have a much higher degree of resistance to hydrolysis than the corresponding fusible polymers. The phosphorus-containing polymers may be used alone or in combination with a variety of additives such as glycols, plasticizers, amines, organic borates, like 2,6-tertiary butyl-4-methyl borate and other alkyl, phenyl, or alkyl-phenyl borates, metal salt stabilizers, metal oxides, fatty acid soaps, organic phosphites such as trisnonyl phenyl phosphite, alkyl phenol sulfides and the like.

The phosphorus-containing polymers according to the present invention may be used as stabilizers or antioxidants alone or in combination with other additives in gasolene, waxes, greases, natural and synthetic lubricating oils, jet fuel, heating fuel oil, and as a general petroleum product additive as a stabilizer or for its phosphorus content. Additionally, the phosphorus-containing polymers may also be employed as tackifiers, as flame retardent or heat resistant materials, in binders such as for grinding wheels, abrasive cloth, or brake and clutch facings, as tire cord adhesives and in other applications.

We claim:
1. The method of preparing a phosphorus-containing polymer which method comprises reacting a trivalent phosphorus halide compound with the hydrogen of the hydroxyl groups of more than one fusible thermoplastic resin molecule under substantially nonaqueous reaction conditions where one mol based on the phenol content of the resin is reacted with from about 0.05 to about 0.33 mol of the trivalent phosphorus halide compound and where the resin molecule is the condensation product of the reaction between an aldehydic compound selected from the group consisting of aliphatic and alicyclic aldehydes and a phenolic compound wherein the hydroxyl group of the phenolic compound is the only ring-substituted oxygen substituent and wherein the phenolic compounds in the resin molecules are linked mainly through the ortho rather than the para position of the phenol rings thereby providing a phosphorus-containing polymer characterized by having a molecular weight of at least 4500 and wherein all the phosphorus valences of the phosphorus atoms of the polymer are connected through oxygen atoms to the phenol rings of more than one fusible resin molecule.

2. The method of claim 1 wherein the fusible thermoplastic resin is prepared by the reaction of less than a stoichiometric amount of formaldehyde in the presence of an acid catalyst with a phenolic compound selected from the groups consisting of phenol and an alkyl-substituted phenol and wherein substantially all of the water of reaction is removed from the thermoplastic resin so prepared prior to reacting the resin molecules with the trivalent phosphorus compound.

3. The method of claim 1 wherein the trivalent phosphorus compound is phosphorus trichloride and the aldehydic compound is formaldehyde.

4. The method of claim 1 wherein the phosphorus trivalent compound is phosphorus trichloride, the aldehydic compound is formaldehyde and the phenolic compound is selected from the group consisting of phenol and a $C_4$-$C_{12}$ para substituted-alkyl phenol.

5. The method of claim 4 wherein the phenolic compound is nonyl phenol.

6. A phosphorus-containing polymer, which polymer is characterized by having a molecular weight of at least 4500 wherein all the phosphorus valences of the phosphorus atoms of the polymer are connected through oxygen atoms to the phenol rings of more than one fusible phenolic-aldehydic thermoplastic resin molecule and wherein the resin molecule is a condensation product of the reaction between an aldehydic compound selected from the group consisting of aliphatic and alicyclic aldehydes and a phenolic compound wherein the hydroxyl group of the phenolic compound is the only ring-substituted oxygen substituent and wherein the phenolic compounds in the resin molecules are linked mainly through the ortho rather than the para position of the phenol rings.

7. The phosphorus-containing polymer prepared as set forth in claim 6 wherein the polymer is characterized by containing free hydroxyl groups on one or more of the phenol rings of the resin molecules.

8. The phosphorus-containing polymer of claim 6 which is further characterized by having a phosphorus content of from about 3 to 8% by weight of the polymer.

9. The phosphorus-containing polymer of claim 6 wherein the fusible thermoplastic resin molecule is a condensation reaction product of formaldehyde and a phenolic compound selected from the group consisting of phenol and alkyl-substituted phenol.

10. The phosphorus-containing polymer of claim 6 wherein the phenol rings in the resin molecule are linked by methylene groups.

11. The phosphorus-containing polymer of claim 6 wherein two of the phosphorus valences are connected through oxygen atoms to adjacent phenol rings of the same resin molecule.

12. The phosphorus-containing polymer of claim 6 wherein all of the phosphorus valences are connected through oxygen atoms to the phenol rings of three different resin molecules.

13. The phosphorus-containing polymer of claim 6 wherein the fusible resin is a condensation product of formaldehyde and nonyl phenol.

14. A polymer composition in which the polymer is subject to the degradation and to which composition has been added a stabilizing amount of a phosphorus-containing polymer of claim 6.

15. A polymer composition in which the polymer is subject to degradation and to which polymer composition has been added a stabilizing amount of a phosphorus-containing polymer prepared of claim 9 and which polymer subject to degradation is selected from the group consisting of copolymers of styrene and butadiene; copolymers of butadiene and acrylonitrile; copolymers of butadiene, acrylonitrile and styrene; polybutadiene; butyl rubber; copolymers of styrene and acrylonitrile; natural rubber; polyvinyl chloride, copolymers of vinyl chloride and vinyl acetate; polystyrene; rubber-modified polystyrene; urethane resins, acrylic resins; copolymers of ethylene and propylene, copolymers of ethylene, propylene and a diene; $C_2$–$C_4$ polyolefinic resins and iso and terephthalatic acid-glycol polyester resins.

16. The polymer composition as defined in claim 14 wherein said phosphorus-containing polymer is present in an amount of from about 0.1 to 5.0% by weight based on the weight of the polymer subject to degradation.

17. The polymer composition as defined in claim 14 which composition includes a stabilizing amount of an organic borate.

18. A polymer composition which includes a copolymer of styrene and butadiene subject to degradation and to which copolymer of styrene and butadiene has been added from about 0.1 to 5.0% by weight of a phosphorus-containing polymer of claim 9.

19. An emulsion which contains a rubbery copolymer of styrene and butadiene and to which emulsion has been added from about 0.1 to 5.0% by weight of the copolymer of styrene and butadiene of a phosphorus-containing resin of claim 13.

20. A polymer composition which includes a polypropylene resin to which resin has been added from about 0.1 to 5.0% by weight of the resin of a phosphorus-containing polymer of claim 9.

References Cited

UNITED STATES PATENTS

| | | | |
|---|---|---|---|
| 3,112,286 | 11/1963 | Morris et al. | 260—45.7 |
| 3,114,419 | 8/1964 | Guttag | 260—59 |
| 3,297,631 | 1/1967 | Bown et al. | 260—45.95 |
| 3,376,364 | 4/1968 | Larrison | 260—45.95 |
| 3,435,097 | 3/1969 | Bottomley et al. | 260—45.7 |

JOHN C. BLEUTGE, Primary Examiner

U.S. Cl. X.R.

51—298; 252—49.9, 400; 260—3, 9, 23.7, 45.1, 45.75, 45.8, 45.85, 45.9, 45.95, 50, 53, 59, 841, 842, 845, 846, 847, 848